United States Patent [19]

Woith

[11] Patent Number: 4,810,053

[45] Date of Patent: Mar. 7, 1989

[54] ALIGNMENT AND RETENTION DEVICE FOR OPTICAL TRANSMISSION

[76] Inventor: Blake F. Woith, 28 Clay, Irvine, Calif. 92714

[21] Appl. No.: 139,135

[22] Filed: Dec. 23, 1987

Related U.S. Application Data

[63] Continuation of Ser. No. 710,732, Mar. 11, 1985, abandoned.

[51] Int. Cl.$^4$ ............................. G02B 6/36; G02B 7/26
[52] U.S. Cl. ................................. 350/96.20; 350/96.18; 350/96.21
[58] Field of Search ................. 350/96.18, 96.20, 96.21

[56] References Cited

U.S. PATENT DOCUMENTS 4,290,667  9/1981  Chown ............................... 350/96.15
4,531,810  7/1985  Carlsen .............................. 350/96.18

Primary Examiner—William L. Sikes
Assistant Examiner—Robert E. Wise

[57] ABSTRACT

An alignment and retention device for optical transmission fibers having an optical lens with a forwardly directed curved surface molded to a rearward extension. The extension has an upper portion and a lower portion separated by a vee-shaped gap, each portion having a longitudinally extending vee-shaped groove for aligning and supporting an optical fiber. The lens and rearward extension are fashioned from a single piece of plastic with an abutment means comprised of a vertical stop at an interface therebetween. A focal point of the lens is located at the abutment means and a retention means securely retains the optical lens while a clamping means surrounds the retention means forcing the upper and lower portions together for capturing the optical fiber within the vee-shaped gap providing forward and lateral fiber alignment without using an index matching adhesive.

12 Claims, 2 Drawing Sheets

ALIGNMENT AND RETENTION DEVICE FOR OPTICAL TRANSMISSION

This is a continuation of application Ser. No. 710,732 filed Mar. 11, 1985, now abandoned.

BACKGROUND OF THE INVENTION

1. Field of the Invention

The invention relates generally to fiber optics and more particularly to a clamping device for positioning and retaining an optical fiber at the focal point of a lens.

2. DESCRIPTION OF THE PRIOR ART

In the field of optical communications, optical fibers are employed to carry data from a transmitting station to a receiving station. In order to transmit an optical signal from a light source via a first optical fiber to another optical conducting element, e.g., a second optical fiber, an optical lens is employed to redirect the light rays of the optical signal. Each optical fiber has an endface in which the optical signal must pass through. To prevent attenuation of the optical signal, the optical fiber endface must interface with the focal point along the optical axis of the lens.

In the past, several techniques have been utilized to align the optical fiber to the lens both in a forward and a lateral mode. Each of the techniques employed one of a plurality of lens contacts for terminating the optical fiber. A first of these techniques teaches that the lens contact is terminated by micropositioning a "pigtailed" optical fiber, that is, the fiber is back illuminated and optimized in position. The optimized position of the fiber is accomplished by projecting the back illumination of the fiber through the lens to a target on a screen. When the back illumination through the lens strikes the target on the screen, the fiber is bonded securely and thus optimized in position with the fiber endface interfacing the focal point of the lens. A second of these alignment techniques involves providing a cylindrical hole behind the lens. The cylindrical hole is aligned along the optical axis of the lens and is blind ended at the focal point of the lens. Also, the cylindrical hole has a diameter that accommodates the optical fiber with a close fit and the optical fiber is bonded within the cylindrical hole with an index of refraction matched adhesive.

The process of aligning the optical fiber to the lens requires achieving both forward alignment and lateral alignment of the optical fiber which is usually a problem. In the first technique the problem manifests itself in the tedious requirement of adjusting the optical fiber to a stringent tolerance to permit the back illumination through the lens to strike the target. A second problem that exists concerns the necessary use of an epoxy to affix the optical fiber to the lens. In the back illumination method, epoxy is required to securely bond the fiber to the lens. In the second technique of alignment utilizing the cylindrical hole in the lens, the epoxy produces a hydraulic effect when the fiber is inserted into the cylindrical hole. The epoxy which is an index of refraction matched adhesive creates a hydraulic force that prevents the fiber endface from reaching the focal point of the lens. This problem results in a loss of or attenuation of the optical signal.

Several prior art references which are relevant to the instant invention have been discovered and will be discussed briefly.

In Contina, British Pat. No. 1,017,354, there is disclosed a system in which light is transmitted from one element to another so that the difference in cross-sections between the elements can be effected within a very short distance without loss of intensity. An optical system comprised of two bundles of optical fibers is arranged with one end of a first bundle facing one end of a second bundle and spaced apart therefrom. The ends of the two bundles are of different areas and a transparent body optically couples the two ends together. The transparent body has a reflecting surface which is substantially ellipsoidal in shape and coaxial with the bundle ends. Light rays of the optical signal are reflected such that they pass through a focal point in an axial endface of the second bundle.

In Kahn, British Pat. No. 1,429,843, there is disclosed a coupling unit consisting of a first housing member and a second housing member each carrying an end region of one of two light guides. The first housing member has a first coupling formed to fit into a second coupling of the second housing member. The first light guide is held centrally in the first coupling by a first body and the second light guide is held centrally in the second coupling by a second body. During manufacture, the ends of the light guides may be polished with the faces of the first and second bodies. A lens is mounted between the ends of the two light guides. Accurate alignment between the lens and the light guide is required.

In Cook, et al., U.S. Pat. No. 3,950,075, there is disclosed an optical communication system which includes a diode for emitting optical wave energy to be coupled to an optical waveguide bundle. A transparent spherical bead is axially aligned with the bundle and the center of the light emitting area of the diode. The bead is securely mounted in an aperture which extends through one end of an insert within a housing. Precise alignment of the center of the bead along the axis of the aperture results from a force fit. The diode is disposed in the housing for proper alignment of the light emitting area of the diode with the bead. The end of the bundle is disposed in a termination ferrule having an aperture, the bundle being potted in the ferrule by a bonding material. The ferrule maintains the fiber bundle in a substantially parallel alignment. A problem is the high tolerance alignment required between the diode, the bead and the bundle.

In Hunzinger, U.S. Pat. No. 4,102,559, there is disclosed an optical structure comprising two very thick plano-convex lenses with a common axis. The convex surfaces of the lenses face each other while a radiation source and an input face of a fiber are each disposed on one of the convex surfaces in the vicinity of the axis. The main feature of the device resides in the considerable thickness of the lenses relative to the radii of curvature of the dioptric faces. As a result, aberrations, in particular spherical aberrations, are reduced while the dimensions of the device are such as to enable easy construction and handling.

In Chown, U.S. Pat. No. 4,147,402, there is disclosed a process for manufacturing a lens termination for an optical fiber using laser machining to form a cavity which centers the fiber in the termination. A plastic preform is provided comprising a tube member with a coaxial bore having one end closed by a lens at least the rearward portion of which comprises a plastic material. The bore and lens are arranged such that the base of the bore lies in the focal plane of the lens. Light is directed from a laser through the lens so as to focus the light onto the base of the bore thus evaporating a portion of the plastic material to form a cavity which, when the termination is in use, receives the bared end of a coated optical fiber. An index matching adhesive is used to bond the fiber within the cavity which produces the previously described hydraulic force preventing the fiber endface from reaching the focal plane of the lens.

In Rush et al., U.S. Pat. No. 4,183,618, there is disclosed an optical waveguide including a connector having a longitudinal bore in which an end of an optical waveguide is to be anchored, lens means for transmitting light from one end of the waveguide and defining a recess including a focal point of the lens means, and a housing in which the connector and lens means are mounted. The terminal also includes an elongate optical member having first and second ends with respective end faces, the first end of the elongate optical member extending partially through the connector and being anchored therein, and the second end of the elongate optical member being mounted in the recess in the lens means with its end face disposed at the focal point of the lens means. The connector includes means for maintaining the first end of the optical member and an end of an optical waveguide in alignment with one another.

In Knoe et al., U.S. Pat. No. 4,327,963, there is disclosed a coupling element for an optical transmission system having a coupling element comprised of a convex lens with a refractive index. The refractive index is dependent on a radius "r" of a shell in the lens. The coupling element further includes a holder through which a capillary extends. The convex lens which is spherical is affixed to an end of an optical fiber with the lens-fiber interface being enclosed within the capillary. The capillary is preferably circular cylindrical in shape and may rest in a v-shaped groove of a holder. A transparent coupling medium may be disposed between the lens and the fiber for light refraction purposes.

Further, the prior art discloses a hermaphroditic rugged optical fiber connector which uses fibers terminated with miniature lenses and intended for use under adverse field conditions. A microlens is positioned on the end of each fiber to form an expanded beam termination which reduces the effect of dirt on the connector performance and provides easy cleaning. Two expanded beam terminations are housed in the rear insert, with a cable strength member clamp, which has a high tensile performance, and are located in a precision front insert in the connector body. A cable end and a plurality of fiber terminations are protected from the environment by being sealed in the connector body cavity. A replaceable protective window forms the cavity seal at the front of the connector while an O-ring in the endbell nut seals the cable entry.

After consideration of the known prior art relevant to the instant invention, the problems involving tedious forward and lateral alignment of the optical fiber to the lens and the necessary use of epoxy to affix the optical fiber to the lens still exist.

SUMMARY OF THE INVENTION

It is therefore an object of the present invention to provide an improved alignment and retention device for optical transmission fibers capable of accurately aligning an optical fiber in the foreward and lateral modes.

It is a further object to provide an improved alignment and retention device for optical transmission fibers capable of being retained in alignment without utilizing a bonding agent.

Briefly, a preferred embodiment of the present invention includes an optical lens having a forwardly directed curved lens surface and a holding means having a rearward extension comprised of an upper portion and a lower portion separated by a vee-shaped gap. The holding means includes a longitudinally extending vee-shaped groove in each of the upper and lower portions which align and support a first light transmitting optical fiber. The lens and rearward extension are fashioned from a single piece of plastic material with an abutment means comprised of a vertical stop at an interface therebetween. A focal point of the lens is located at the abutment means and a retention means securely retains the first light transmitting optical fiber while a clamping means surrounding the retention means forces the upper portion of the holding means towards the lower portion of the holding means which closes the vee-shaped gap about the first light transmitting optical fiber.

The first light transmitting optical fiber is guided into the vee-shaped gap with the longitudinally extending vee-shaped groove of each of the upper and lower portions surrounding the fiber. The fiber is inserted until a terminal end of the fiber abuts the vertical stop of the abutment means. The lens including the fiber is inserted into an optical contact assembly having an outer eyelet for surrounding the lens. The lens engages a reduction in diameter within the outer sleeve which compresses and securely clamps the retention means about the first light transmitting optical fiber. The terminal end of the fiber is located at the focal point of the lens which ensures forward and lateral fiber alignment and reduction of refraction and attenuation of an optical signal between the first light transmitting optical fiber and a second light transmitting optical fiber without the need for an index matching adhesive material.

A first alternative embodiment of the present invention includes each of the structural elements previously described except that the outer sleeve of the optical contact device includes a restriction in lieu of the reduction in diameter of the outer sleeve. The restriction in the outer sleeve compresses and securely clamps the retention means about the first light transmitting optical fiber.

An advantage of the alignment and retention device of the present invention is that the optical transmission fiber may be accurately aligned in the forward and lateral modes.

Another advantage is that the alignment and retention device is capable of retaining the optical transmission fiber in alignment without utilizing a bonding agent.

These and other objects and advantages of the present invention will no doubt become obvious to those of ordinary skill in the art after having read the following detailed description of the preferred embodiment(s) which are illustrated in the various drawing figures.

IN THE DRAWING

DETAILED DESCRIPTION OF THE PREFERRED EMBODIMENT

Figure 1:
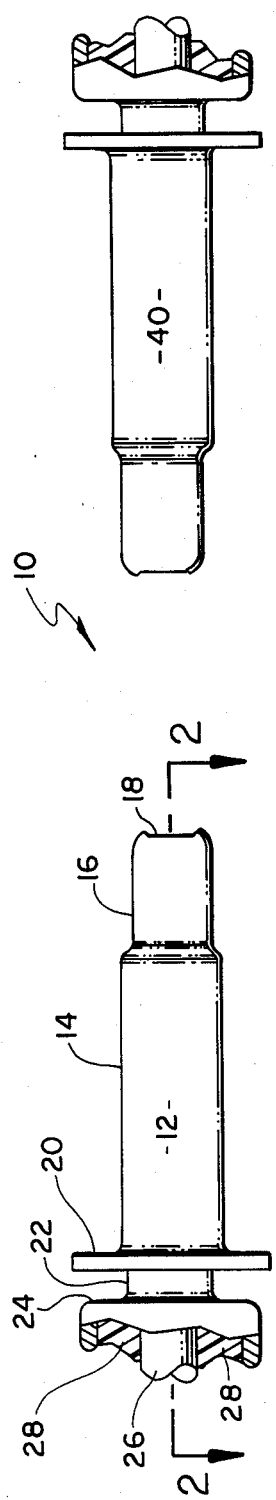
FIG. 1 is a side elevational view of an alignment and retention device for optical transmission fibers in accordance with the present invention.

FIG. 1 illustrates an alignment and retention device for optical transmission fibers referred to by the general reference character 10 and incorporating the present invention. The alignment and retention device 10 includes an optical contact assembly 12 having an outer eyelet 14 with a forward reducer 16 having a forward opening 18 and a circular flange 20, an inner eyelet 22 having a flared end 24, and a buffer material 26 surrounded by a packing substance 28. FIG. 1 further illustrates an opposing optical contact assembly identified by the reference number 40 and being identical in structure to the optical contact assembly 12. For simplicity, only the optical contact assembly 12 will be described.

Figure 2:
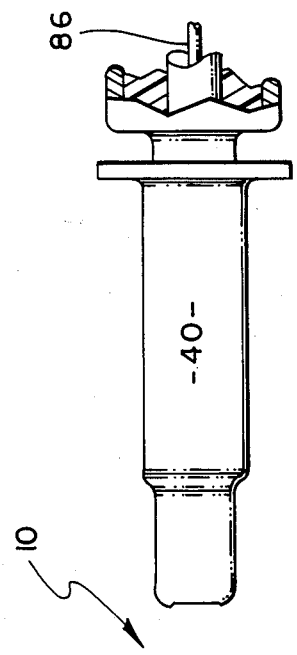
FIG. 2 is a cross-sectional view of the alignment and retention device taken along the Line 2—2 of FIG. 1.

FIG. 2 illustrates in cross-section the optical contact assembly 12 of the alignment and retention device 10 and further includes an optical lens 44 having an optical axis 45 and a forwardly directed curved lens surface 46, a holding means 48 having a rearward extension 50 with an upper portion 52 and a lower portion 54 separated by a vee-shaped gap 56. Additionally, an abutment means 58 with a vertical stop 60 acts to limit the travel of a terminal end 62 of a first light transmitting optical fiber 64 having a center axis 65 and a focal point 66 located at the abutment means 58. An optical signal 68 is also shown within the first optical fiber 64. Also included is a retention means 70 surrounded by the forward reducer 16 which acts as a clamping means 72, a set of radiused surfaces 74 located at a rearward end of the rearward extension 50, an inspection window 76 and a rolled lip 78 which forms the forward opening 18. Further, the opposing optical contact assembly 40 includes a second light transmitting optical fiber 86 (not shown).

Figure 3:
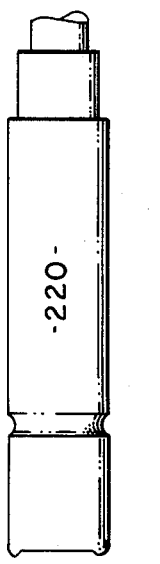
FIG. 3 is a cross-sectional view of the alignment and retention device taken along the Line 3—3 of FIG. 2.

FIG. 3 illustrates a bottom surface 100 of the upper portion 52 and a top surface 102 of the lower portion 54 of the holding means 48 illustrated in FIG. 2. The bottom surface 100 includes an upper longitudinally extending vee-shaped groove 104 while the top surface 102 includes a lower longitudinally extending vee-shaped groove 106 with groove 104 and groove 106 forming a diamond-shaped groove 108.

Referring again to FIG. 2, the optical lens 44 of the optical contact assembly 12 is of the collimating variety and is formed from acrylic plastic. The first optical fiber 64 and the second optical fiber 86 (not shown) are each comprised of glass silica; however, each may also be formed from plastic. The first optical fiber 64 fits within and is captured between the upper vee-shaped groove 104 and the lower vee-shaped groove 106. The first optical fiber 64 is surrounded by the buffer material 26 which is a pliable silicon material utilized for protecting the first optical fiber 64. The optical lens 44 includes the forwardly directed curved lens surface 46 for reducing refraction and attenuation of an optical signal which is transmitted from a first optical transmission means to a second optical transmission means. Note that the first optical transmission means can be the first light transmitting optical fiber 64 and the second optical transmission means can include the second light transmitting optical fiber 86. The holding means 48 which is connected to the optical lens 44 includes the rearward extension 50 having the upper portion 52 and the lower portion 54. The rearward extension 50 is fashioned from the same block of acrylic plastic as is the optical lens 44. The upper portion 52 is separated from the lower portion 54 by the vee-shaped gap 56 which is formed by the bottom surface 100 of the upper portion 52 of the rearward extension 50 and the top surface 102 of the lower portion 54 of the rearward extension 50 as shown in FIG. 3. The upper portion 52 includes the upper vee-shaped groove 104 within the bottom surface 100 and the lower portion 54 includes the lower vee-shaped groove 106 within the top surface 102. The upper vee-shaped groove 104 and the lower vee-shaped groove 106 are employed to align and hold the fight optical fiber 64. To this end, the upper vee-shaped groove 104 is symmetrically located in the bottom surface 100 of the upper portion 52 and the lower vee-shaped groove 106 is symmetrically located in the top surface 102 of the lower portion 54. The upper vee-shaped groove 104 is symmetrically aligned with the lower vee-shaped groove 106 for forming the diamond-shaped groove 108 when the vee-shaped gap 56 is closed. The diamond-shaped groove 108 is employed to align and retain the center axis 65 of the first optical fiber 64 along the optical axis 45 of the optical lens 44 illustrated best in FIG. 2. Further, the center axis 65 of the first optical fiber 64 is supported by the diamond-shaped groove 108 in co-axial alignment with the optical axis 45 of the optical lens 44. The rearward extension 50 has a set of radiused surfaces 74, the first of the set 74 being located at a rearward end of the upper portion 52 and the second of the set 74 being located at a rearward end of the lower portion 54. The set of radiused surfaces 74 provides guidance to the first optical fiber 64 when inserted into the rearward extension 50 and the optical lens 44 which are molded together from a single piece of plastic material. The holding means 48 and lens 44 together form an optical fiber coupling.

The abutment means 58 is formed from the same block of plastic material as the optical lens 44 and is located at an interface between the optical lens 44 and the rearward extension 50. The abutment means 58 includes the vertical stop 60 which is located where the bottom surface 100 of the upper portion 52 of the rearward extension 50 and the top surface 102 of the lower portion 54 of the rearward extension 50 interface with the rearward portion of the optical lens 44. The vertical stop 60 is employed to position the terminal end 62 of the first optical fiber 64 at the focal point 66 of the optical lens 44. The focal point 66 is located at the vertical stop 60 of the abutment means 58 which is the point where the light exits the first optical fiber 64. The locus of points of light exiting the first optical fiber 64 forms a conical pattern which is collimated by the forwardly directed curved lens surface 46 of the optical lens 44.

The retention means 70 is associated with the holding means 48 and includes the upper portion 52 and the lower portion 54. The first optical fiber 64 is securely retained between the upper vee-shaped groove 104 and the lower vee-shaped groove 106 when the vee-shaped gap 56 is closed forming the diamond-shaped groove 108.

The clamping means 72 surrounds the alignment and retention device 10 and includes the outer eyelet or sleeve 14 and the forward reducer 16 which is a restriction in the outer eyelet 14. The forward reducer 16 is employed to compress the upper portion 52 of the holding means 48 towards the lower portion 54 of the holding means 48 for closing the vee-shaped gap 56 about the first optical fiber 64. It is when the optical lens 44 is inserted and clamped into the outer eyelet 14 that the first optical fiber 64 is captured by the clamping means 72. The outer eyelet 14 may be comprised of stainless steel or brass and may include the inspection window 76 located adjacent to the forward reducer 16. The inspection window 76 may include a cover (not shown) comprised of any suitable transparent material. The inner eyelet 22 is also comprised of stainless steel or brass and fits snuggly about the buffer material 26. The outer eyelet 14 engages the inner eyelet 22 with a sliding fit to interlock the optical lens 44 in position. The inspection window 76 located in the outer eyelet 14 is employed to visually inspect the optical contact assembly 12 after assembly to determine if the optical lens 44 is in the proper forward position. The optical contact assembly 12 of the alignment and retention device 10 faces the opposing optical contact assembly 40, both contact assemblies 12, 40 being identical in construction. The circular flange 20 is formed at a first end of the outer eyelet 14 and acts as a retention flange. Thus, when the optical contact assembly 12 is forced into a connector device (not shown) with an insertion tool, the optical contact assembly 12 may be held in position by a snap retainer (not shown) associated with the circular flange 20. An example of a connector device in a fiber optic type connector application is a fiber optic multi-channel connector or a connector device meeting the requirements of military standard connector 38999. The forward opening 18 which includes the rolled lip 78 permits the light to pass out of the optical contact assembly 12 and into the opposing optical contact assembly 40. Since the vertical stop 60 is located at the focal point 66, the convex curvature of the optical lens 44 determines where the light is focused inside the lens 44. As the light leaves the first optical fiber 64 which is an optical waveguide, collimation of the light rays occur within the convex curvature of lens 44.

Figure 4:
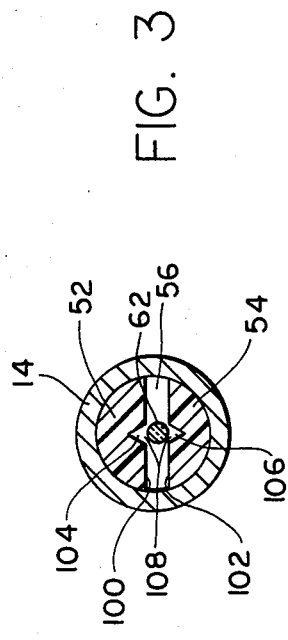
FIG. 4 is a side elevational view of an alternative embodiment of an alignment and retention device for optical transmission fibers of the present invention.
Figure 5:
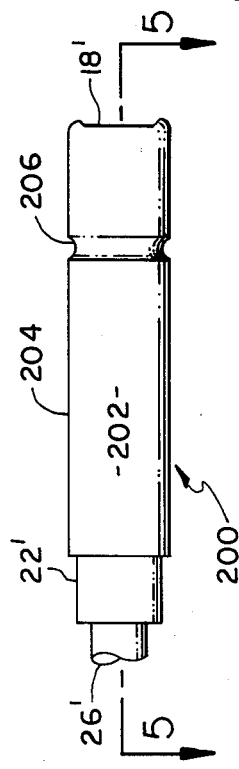
FIG. 5 is a cross-sectional view of the alignment and retention device taken along the Line 5—5 of FIG. 4.
Figure 5:
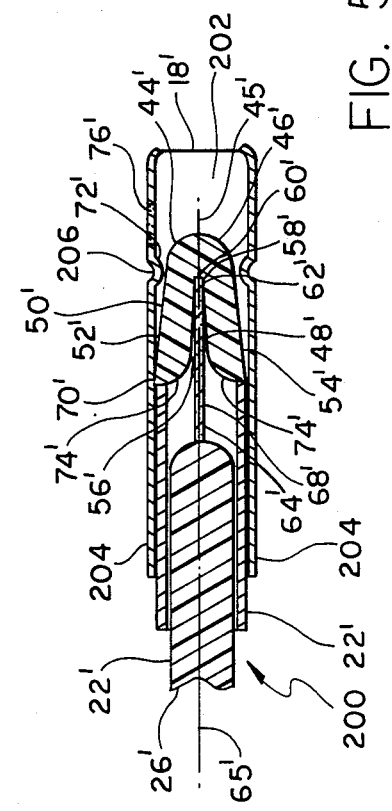

FIG. 4 illustrates an alternative embodiment of the alignment and retention device referred to by the general reference character 200 and incorporating the present invention. Those elements which are duplicate to those of the alignment and retention device 10 (preferred embodiment) are designated with a prime designation. The alignment and retention device 200 includes an optical contact assembly 202, an outer eyelet 204, a reducer ring 206, a forward opening 18′, an inner eyelet 22′ and a plurality of buffer material 26′. Also included is an opposing optical contact assembly 220. Referring to FIG. 5, alignment and retention device 200 also includes the optical lens 44′ having an optical axis 45′, a forwardly directed curved lens surface 46′, a holding means 48′, a rearward extension 50′ having an upper portion 52′ and a lower portion 54′, a vee-shaped gap 56′, an abutment means 58′, a vertical stop 60′, a terminal end 62′ of a first light transmitting optical fiber 64′ having a center axis 65′, a focal point 66′ of the lens 44′, an optical signal 68′ within the first optical fiber 64′, a retention means 70′, a clamping means 72′, a set of radiused surfaces 74′, an inspection window 76′ and a rolled lip 78′ of the forward opening 18′. Further, a second light transmitting optical fiber 86′ (not shown) is located within the opposing optical contact assembly 220. A cross-section of the rearward extension 50′ would be duplicate to the structure illustrated in FIG. 3. The salient feature of the alignment and retention device 200 is the outer configuration of the outer eyelet 204 which includes the reducer ring 206 as the clamping means 72′ in lieu of the forward reducer 16. The reducer ring 206 serves as a compression device to hold the lens 44′ in position. The inner eyelet 22′ continues to abut the set of radiused surfaces 74′ of the rearward extension 50′. The remainder of the elements are assembled as in the alignment and retention device 10 with the inner eyelet 22′ and the outer eyelet 204 mating with a sliding fit.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An alignment and retention device for an optical fiber which has a terminal end comprising, in combination:

a one-piece plastic optical lens having a front and forming a forwardly directed curved lens surface;

said optical lens having a rearward extension comprised of separate upper and lower portions provided by a largely vee-shaped gap extending across said extension between its opposite sides, each of said upper and lower portions having facing surfaces formed with longitudinally extending matching grooves for aligning and holding said optical fiber, said upper and lower portions being deflectable towards each other to reduce said gap and clamp an optical fiber between them;

the forward ends of said grooves terminating at an abutment means located substantially at the focal point of the optical lens; and a clamping means for forcing said upper portion of said extension towards said lower portion of said extension to close said vee-shaped gap about said optical fiber to clamp the fiber in place.

2. The alignment and retention device as recited in claim 1 wherein the optical lens is molded from acrylic plastic material.

3. The alignment and retention device as recited in claim 1 wherein said upper portion groove is symmetrically located in said facing surface of said upper portion and said lower portion groove is symmetrically located in said facing surface of said lower portion.

4. The alignment and retention device as recited in claim 3 wherein said grooves are substantially vee-shaped and form a substantially diamond-shaped passage at a location where the clamping means closes said vee-shaped gap.

5. The alignment and retention device as recited in claim 4 wherein a said diamond-shaped passage aligns and retains said optical fiber along an optical axis of the optical lens and wherein a center axis of the optical fiber is supported by said diamond-shaped passage in coaxial alignment with said optical axis of the optical lens.

6. The alignment and retention device as recited in claim 1 wherein said rearward extension has a radiused surface located at a rearward end of said upper portion of said rearward extension and at a rearward end of said lower portion of said rearward extension for providing guidance to said optical fiber.

7. The alignment and retention device as receited in claim 1 wherein said clamping means comprises an outer sleeve for surrounding said extension, said optical lens being inserted into said sleeve from the rear of said sleeve, said outer sleeve having a restriction therein which engages the outer surfaces of said upper and lower portions of said extension and moves them towards each other as said extension moves within said restriction during insertion of said lens into said sleeve to clamp said optical fiber.

8. The alignment and retention device for an optical fiber as recited in claim 7 wherein the outer surfaces of said upper and lower portions extend rearwardly and outwardly whereby when said rearward extension is pushed forwardly into said restriction said upper and lower portions will be deflected inwardly toward each other.

9. The alignment and retention device for an optical fiber as recited in claim 8 wherein an inner sleeve is slidably mounted in the rear of said outer sleeve with its forward end engaging said upper and lower portions of said extension.

10. An alignment and retention device for an optical fiber comprising, in combination:
  a one-piece molded plastic optical lens having a forwardly directed curved lens surface;
  said optical lens having a rearward extension comprised of separate upper and lower portions provided by a largely vee-shaped gap extending across said extension between its opposite sides, said vee-shaped gap formed by a botton surface of said upper portion of said rearward extension and a top surface of said lower portion of said rearward extension with each of said portions including a longitudinally extending groove for aligning and holding said optical fiber, the groove in said upper portion being symetrically aligned with said groove in said lower portion for forming a largely diamond-shaped passage when said vee-shaped gap is closed, said diamond-shaped passage aligning and retaining said optical fiber along an optical axis of the optical lens and wherein a center axis of the optical fiber is supported by said diamond-shaped passage in coaxial alignment with said optical axis of the optical lens, the forward end of said passage terminating at a vertical stop located at the focal point of the optical lens; and
  an outer sleeve surrounding said optical lens, said sleeve having a restriction therein for forcing said upper and lower portions of said rearward extension toward each other to close said vee-shaped gap about said light transmitting optical fiber when said optical lens is inserted into said outer sleeve.

11. Optical fiber coupling apparatus comprising:
  a one-piece plastic coupling which has a forwardly directly curved lens and a pair of separate, laterally spaced rearward extensions which form a gap that can receive an optical fiber therein, and a stop located at the forward end of said gap at the focal point of the opticalens, said extensions being movable toward each other to clamp an optical fiber between them; and
  a sleeve which can receive said coupling by moving the coupling into and along the sleeve, said sleeve having restricting means therein formed to compress said coupling to move said rearward extensions toward each other as said coupling is moved along said sleeve, to clamp an optical fiber between said rearward extensions.

12. The apparatus described in claim 11 wherein;
said lens has an axis aligned with said stop; and
each of said rearward extensions includes a groove which can engage one side of an optical fiber, to hold the optical fiber in alignment with said lens axis.

* * * * *